(12) United States Patent
Chen

(10) Patent No.: US 12,085,122 B2
(45) Date of Patent: Sep. 10, 2024

(54) ALL-TERRAIN VEHICLE

(71) Applicant: SEGWAY TECHNOLOGY CO., LTD., Changzhou (CN)

(72) Inventor: Mingtang Chen, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 484 days.

(21) Appl. No.: 17/480,272

(22) Filed: Sep. 21, 2021

(65) Prior Publication Data
US 2022/0090623 A1  Mar. 24, 2022

(30) Foreign Application Priority Data

Sep. 22, 2020 (CN) .......................... 202022092242.1

(51) Int. Cl.
*F16C 1/04* (2006.01)
*F16C 1/28* (2006.01)
*F16C 35/063* (2006.01)
*F16C 35/067* (2006.01)

(52) U.S. Cl.
CPC ................ *F16C 1/04* (2013.01); *F16C 1/28* (2013.01); *F16C 35/063* (2013.01); *F16C 35/067* (2013.01); *F16C 2326/06* (2013.01)

(58) Field of Classification Search
CPC .. F16C 1/04; F16C 1/28; F16C 35/063; F16C 35/067; F16C 2326/06
See application file for complete search history.

(56) References Cited

U.S. PATENT DOCUMENTS

| 1,221,638 | A | 4/1917 | Walker |
| 6,935,453 | B2 | 8/2005 | Mizuta et al. |
| 7,377,342 | B2 * | 5/2008 | Miyazaki ............ F16H 57/043 180/62 |
| 8,701,820 | B2 * | 4/2014 | Gagnon ................ B62D 6/007 180/446 |
| 11,912,956 | B2 * | 2/2024 | Sudo .................. F16C 33/6688 |

FOREIGN PATENT DOCUMENTS

| CN | 2696900 Y | * | 5/2005 |
| CN | 203723096 U | * | 7/2014 |
| CN | 204586507 U |   | 8/2015 |

OTHER PUBLICATIONS

Canadian Office Action dated Dec. 16, 2022 for Application No. 3,131,306, 6 pages.

* cited by examiner

*Primary Examiner* — Faye M Fleming
(74) *Attorney, Agent, or Firm* — Frost Brown Todd LLP

(57) ABSTRACT

An all-terrain vehicle includes a frame; a cab located in the middle of the frame; a front axle located in front of the cab; a power assembly located behind the cab; and a transmission structure coupled to the front axle and the power assembly, and comprising a front transmission shaft, a rear transmission shaft, and an intermediate transmission component, the intermediate transmission component having a first end coupled to the front transmission shaft and a second end coupled to the rear transmission shaft; an end, away from the intermediate transmission component, of the front transmission shaft being coupled to the front axle, and an end, away from the intermediate transmission component, of the rear transmission shaft being coupled to the power assembly; and a connection point between the intermediate transmission component and the front transmission shaft being located in front of the cab.

20 Claims, 8 Drawing Sheets

ALL-TERRAIN VEHICLE

CROSS-REFERENCE TO RELATED APPLICATIONS

This application is based on and claims priority to Chinese Application No. 202022092242.1, filed on Sep. 22, 2020, the entire contents of which are incorporated herein by reference for all purposes.

FIELD

Embodiments of the present disclosure belong to the field of vehicle equipment manufacturing technology and, more particularly, to an all-terrain vehicle.

BACKGROUND

At present, general vehicles usually adopt transmission structures in a form of a single transmission shaft with two ends coupled to a drive axle and an engine, or in a form of two transmission shafts first connected head to tail and then coupled to a drive axle and an engine at two ends. Either way, problems such as poor transmission effect may occur in the case of a transmission shaft designed with a large angle or insufficient space, and abnormal wear of joints may be caused during long-term use, which affects driving safety.

In short, the existing transmission structures have poor transmission effect, and driving safety hazards since the joints are prone to wear.

SUMMARY

An all-terrain vehicle includes a frame; a cab located at a middle portion of the frame; a front axle located at a front side of the cab; a power assembly located at a rear side of the cab; and a transmission structure coupled to the front axle and the power assembly, and including a front transmission shaft, a rear transmission shaft, and an intermediate transmission component. The intermediate transmission component has a first end coupled to the front transmission shaft and a second end coupled to the rear transmission shaft; an end, away from the intermediate transmission component, of the front transmission shaft is coupled to the front axle, and an end, away from the intermediate transmission component, of the rear transmission shaft is coupled to the power assembly; and a connection point between the intermediate transmission component and the front transmission shaft is located at the front side of the cab.

BRIEF DESCRIPTION OF THE DRAWINGS

To describe technical solutions in embodiments of the present disclosure or in the related art more clearly, the accompanying drawings involved in the description of the embodiments or the related art will be briefly introduced below. Obviously, the accompanying drawings described below merely show some embodiments of the present disclosure, and those skilled in the art may obtain other drawings based on these drawings without paying creative efforts.

DETAILED DESCRIPTION

Embodiments of the present disclosure will be described in detail in combination with the accompanying drawings and examples, to fully understand how the present disclosure solves the technical problems and achieves the technical effects by using the technical means and to implement the present disclosure.

For example, some words are used in the specification and claims to refer to specific assemblies. It can be understood by those skilled in the art that hardware manufacturers may use different terms to address the same assembly. The specification and claims distinguish assemblies by differences in function rather than in name. The term "including" throughout the specification and claims is an open-ended term, and should be construed as "including but not limited to". The term "substantially" means that those skilled in the art may solve the technical problem within an acceptable error range, and basically achieve the technical effects. In addition, the term "coupled" or "electrically coupled" here includes any direct and indirect electrical coupling means. Therefore, if a first device is coupled to a second device, it means that the first device may be electrically coupled to the second device directly, or may be electrically coupled to the second device indirectly through other devices or coupling means. Some embodiments for implementing the present disclosure will be described later, but such description is merely for the purpose of explaining general principles of the present disclosure, and is not intended to limit the scope of the present disclosure. The protection scope of the present disclosure shall be subject to the appended claims.

It should also be noted that terms "including", "comprising" or any other variation are non-exclusive, such that processes, methods, products or systems that include a series of elements include not only those elements, but also other elements not explicitly listed, or further include inherent elements for such processes, methods, products or systems. Without more restrictions, elements defined by the statement "including a/an . . . " do not exclude the existence of other elements in the same process, method, product or system.

Figure 1:
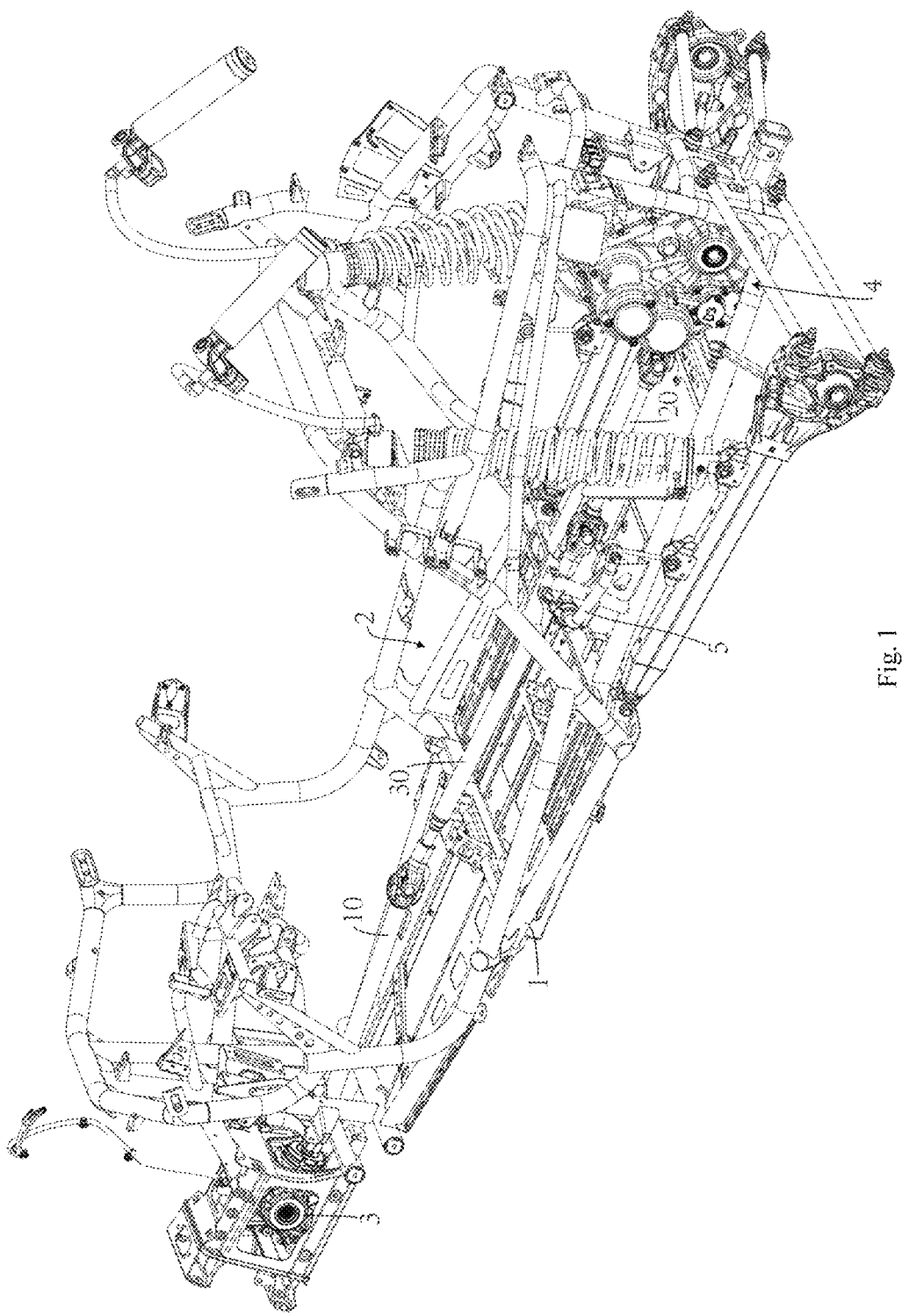
FIG. 1 is a perspective view of an all-terrain vehicle according to embodiments of the present disclosure.

Referring to FIG. 1 that is a perspective view of an all-terrain vehicle according to embodiments of the present disclosure, the all-terrain vehicle includes a frame 1, a cab 2 located at a middle portion of the frame 1, a front axle 3 located at a front side of the cab 2, a power assembly 4 located at a rear side of the cab 2, and a transmission structure coupled to the front axle 3 and the power assembly 4. The transmission structure includes a front transmission shaft 10, a rear transmission shaft 20 and an intermediate transmission component 30.

The intermediate transmission component 30 has a first end coupled to the front transmission shaft 10, and a second end coupled to the rear transmission shaft 20. An end of the front transmission shaft 10 away from the intermediate transmission component 30 is coupled to the front axle 3, and an end of the rear transmission shaft 20 away from the intermediate transmission component 30 is coupled to the power assembly 4. A connection point between the intermediate transmission component 30 and the front transmission shaft 10 is located at the front side of the cab 2.

The cab 2 and the power assembly 4 according to the embodiments of the present disclosure are arranged above the frame 1. The front axle 3 is an axle of front wheels of the all-terrain vehicle, and is arranged at the front side of the cab 2. The power assembly 4 is a power output assembly of the all-terrain vehicle, and includes an engine, a gearbox, and the like. The power assembly 4 is arranged at the rear side of the cab 2, and the power assembly 4 outputs power outwardly and transmits the power to the front axle 3 through the transmission structure.

Figure 2:
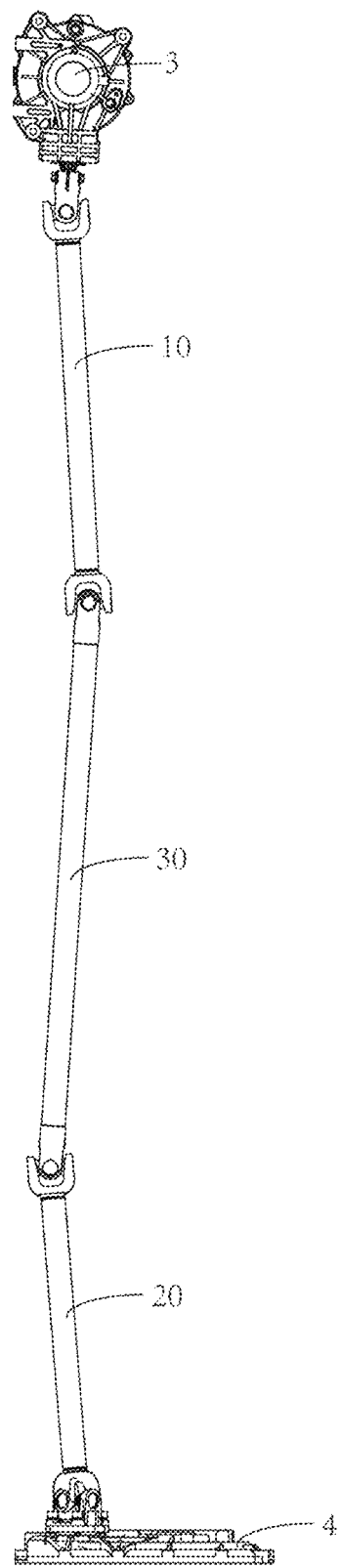
FIG. 2 is a perspective view of a transmission structure according to embodiments of the present disclosure.

Specifically, in combination with FIG. 2, the intermediate transmission component 30 is composed of at least one transmission shaft, and two opposite ends of the intermediate transmission component 30 are coupled to the front transmission shaft 10 and the rear transmission shaft 20, respectively. Here, specific connection modes include transmissive connection through splines or other structures, to achieve rapid power transmission among a plurality of transmission shafts. An end of the front transmission shaft 10 which is not coupled to the intermediate transmission component 30, i.e., the end away from the intermediate transmission component 30, is coupled to the front axle 3 of the vehicle. The connection mode includes but is not limited to spline connection, to enable the transmission shaft to transmit kinetic energy to the front axle 3, and in turn drive two front wheels to rotate. An end of the rear transmission shaft 20 which is not coupled to the intermediate transmission component 30, i.e., the end away from the intermediate transmission component 30, is coupled to the power assembly 4 of the vehicle. The connection mode includes but is not limited to spline connection, to enable the power assembly 4 to transmit kinetic energy to the transmission shaft, and in turn drive the two front wheels to rotate through the front axle 3. The connection point between the intermediate transmission component 30 and the front transmission shaft 10 is located at the front side of the cab 2.

In the embodiments of the present disclosure, by additionally arranging the intermediate transmission component between the front transmission shaft and the rear transmission shaft, the transmission structure may form a multi-segment transmission structure including at least three segments of transmission shafts. When the vehicle is designed with a large transmission angle and has limited space, an angle between two adjacent transmission shafts can be effectively reduced, and transmission effect between the two adjacent transmission shafts can be improved to enhance an overall transmission effect of the transmission structure. Moreover, by reducing the angle between the two adjacent transmission shafts, wear of joints at the connection between the two transmission shafts can be diminished, which may not only improve driving safety performance of the vehicle for long-term use, but also reduce wear noise during driving of the vehicle.

Further, a connection point between the intermediate transmission component 30 and the rear transmission shaft 20 is located at the rear side of the cab 2.

Specifically, the second end of the intermediate transmission component 30, which is away from the front transmission shaft 10, is located behind the cab 2 and coupled to an end of the rear transmission shaft 20 close to the intermediate transmission component 30, such that a length of the intermediate transmission component 30 is greater than a length of the cab 2 along a length direction of a vehicle body, and the connection points between the intermediate transmission component and the front and rear transmission shafts are located at the front and rear sides of the cab 2, which is more conducive to effective reduction of the angle between the two adjacent transmission shafts in the case of large transmission angle design and limited space of the vehicle, thereby improving the transmission effect between the two adjacent transmission shafts.

In addition, in other embodiments of the present disclosure, the all-terrain vehicle further includes a stabilizer bar 5 arranged on the rear side of the cab 2, and the connection point between the intermediate transmission component 30 and the rear transmission shaft 20 is located behind the stabilizer bar 5.

Specifically, a middle portion of the stabilizer bar 5 is coupled to the frame 2, and two ends of the stabilizer bar 5 are coupled to two rear wheels of the all-terrain vehicle, to stabilize the wheels when traveling. The stabilizer bar 5 is arranged at the rear side of the cab 2 and located in front of the connection point between the intermediate transmission component 30 and the rear transmission shaft 20, that is, the connection point between the intermediate transmission component 30 and the rear transmission shaft 20 is located behind the stabilizer bar 5. Such a design enables the power assembly 4, the rear transmission shaft 20 and the wheels at the rear side of the cab 2 to be regarded as a whole, to be stabilized by the stabilizer bar 5.

Figure 3:
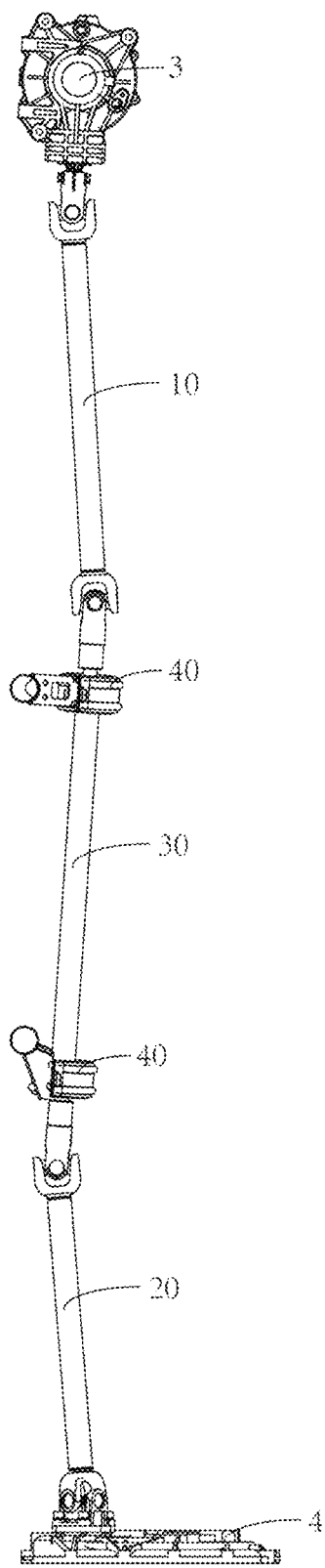
FIG. 3 is another perspective view of a transmission structure according to embodiments of the present disclosure.
Figure 4:
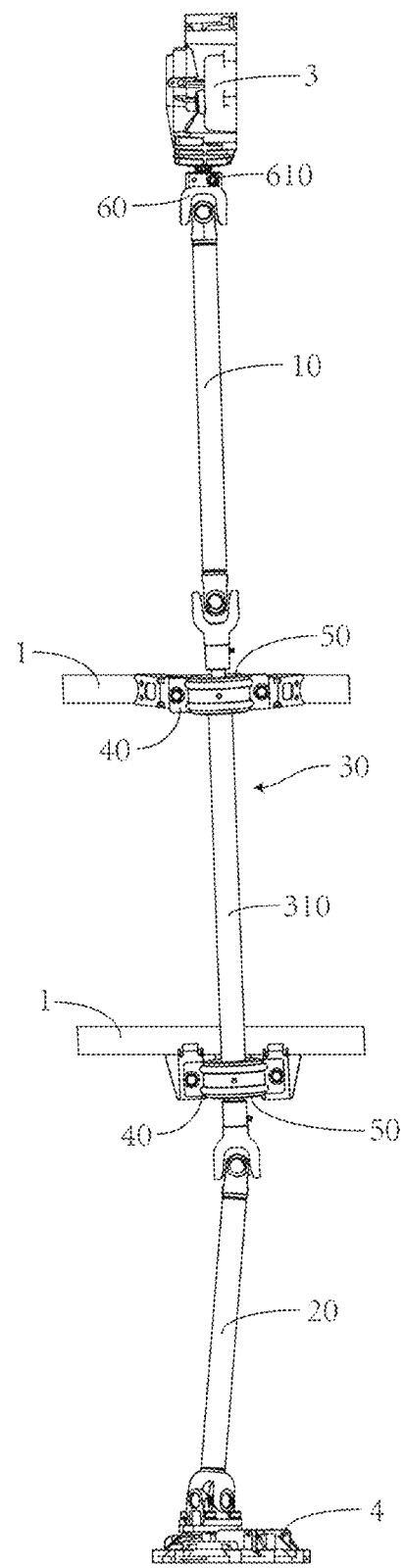
FIG. 4 is a perspective view of a transmission structure and a frame according to embodiments of the present disclosure.

Further, in combination with FIG. 3 and FIG. 4, in other embodiments of the present disclosure, two first support seats 40 are arranged on the frame 1; the intermediate transmission component 30 and the first support seats 40 are coupled through bearings 50; one of the two first support seats 40 is close to the connection point between the intermediate transmission component 30 and the front transmission shaft 10, and the other of the two first support seats 40 is close to the connection point between the intermediate transmission component 30 and the rear transmission shaft 20.

Specifically, the two first support seats 40 are arranged on the frame 1 above two positions close to the ends of the intermediate transmission component 30, and an end of each of the first support seats 40, away from the frame 1, is coupled to the intermediate transmission component 30 arranged below the first support seat, to secure the intermediate transmission component 30. Meanwhile, multi-point connection formed between the transmission structure and the frame 1 can effectively reduce vibration and noise caused by rotation of the transmission shaft when the vehicle is traveling, and improve comfort of driving the vehicle. Moreover, the bearings 50 are arranged between the first support seats 40 and the intermediate transmission component 30, that is, the intermediate transmission component 30 and the first support seats 40 are coupled through the bearings 50. The bearings 50 include but are not limited to ordinary rolling bearings. Through the arrangement of the bearings 50, smoothness of rotation of the transmission shaft can be improved, and the transmission effect of the transmission structure can be further improved. Furthermore, the vibration and noise caused by the rotation of the transmission shaft when the vehicle is traveling can be further reduced, improving the comfort of driving the vehicle.

Further, the intermediate transmission component 30 includes a first transmission shaft 310 with two ends coupled to the front transmission shaft 10 and the rear transmission shaft 20, respectively.

Specifically, the intermediate transmission component 30 is one first transmission shaft 310, that is, the transmission structure is composed of three transmission shafts (namely, the front transmission shaft 10, the first transmission shaft 310, and the rear transmission shaft 20) sequentially coupled head to tail. Two ends of the first transmission shaft 310 are provided with bearings 50, which include but are not limited to ordinary rolling bearings. The two ends of the first transmission shaft 310 are fitted and fixed in respective inner rings of the bearings 50, and respective outer rings of the bearings 50 are fixedly coupled to the frame 1 through connecting pieces (not shown). The connecting piece and the bearing 50 form the first support seat 40.

The situation that the intermediate transmission component 30 is composed of a single transmission shaft is discussed in the above embodiments. In other embodiments of the present disclosure, the intermediate transmission component 30 includes at least two second transmission shafts 320, and the at least two second transmission shafts 320 are sequentially coupled head to tail, ends of the at least two second transmission shafts 320 on both sides are coupled to the front transmission shaft 10 and the rear transmission shaft 20, respectively.

Here, the intermediate transmission component is composed of at least two second transmission shafts, and the adjacent two second transmission shafts are coupled through a spline and other structures, that is, the second transmission shafts are sequentially coupled head to tail to achieve power transmission between the second transmission shafts, ends of the at least two second transmission shafts on both sides, i.e., a front end and a rear end of the intermediate transmission component are coupled to the front transmission shaft 10 and the rear transmission shaft 20, respectively.

Further, similar to the above situation where two ends of the first transmission shaft 310 are fixedly coupled to the frame 1 through the first support seats 40, a second support seat (not shown) is arranged at a position close to each end of each second transmission shaft 320, a first end of the second support seat is coupled to the second transmission shaft 320, and a second end of the second support seat is coupled to the frame 1. In the present embodiment, the arrangement of the second support seat can effectively reduce the vibration and noise caused by rotation of each transmission shaft when the vehicle is traveling, further improving the comfort of driving the vehicle.

Further, in order to improve smoothness of the second transmission shaft during rotation, a bearing may also be arranged between the end of the second transmission shaft and the second support seat, which may be referred to the description of the above embodiments for detail.

In addition, the front transmission shaft 10 is coupled to the front axle 3 through a spline 60, and at least one fastening screw 610 is arranged at the connection.

Specifically, the end of the front transmission shaft 10 away from the intermediate transmission component 30 is coupled to the front axle 3 through the spline 60, to transmit kinetic energy from the front transmission shaft 10 to the front axle 3. In order to improve firmness of the connection between the front transmission shaft 10 and the front axle 3, the front transmission shaft 10 and the front axle 3 are fixed by at least one fastening screw 610, thereby improving the effect of transmission from the front transmission shaft 10 to the front axle 3.

Moreover, the connection point between the intermediate transmission component 30 and the front transmission shaft 10 is higher than the connection point between the intermediate transmission component 30 and the rear transmission shaft 20.

Specifically, the intermediate transmission component 30 presents a situation where it is higher in the front and low in the rear along the length direction of the vehicle body, such that the connection point in front of the cab 2 is higher than the connection point behind the cab 2. Such a design can have a better transmission effect in the case of limited space and excessive large transmission angle of the vehicle, and can effectively reduce height of the power assembly 4, lower a center of the vehicle chassis and improve the driving stability of the vehicle.

Figure 5:
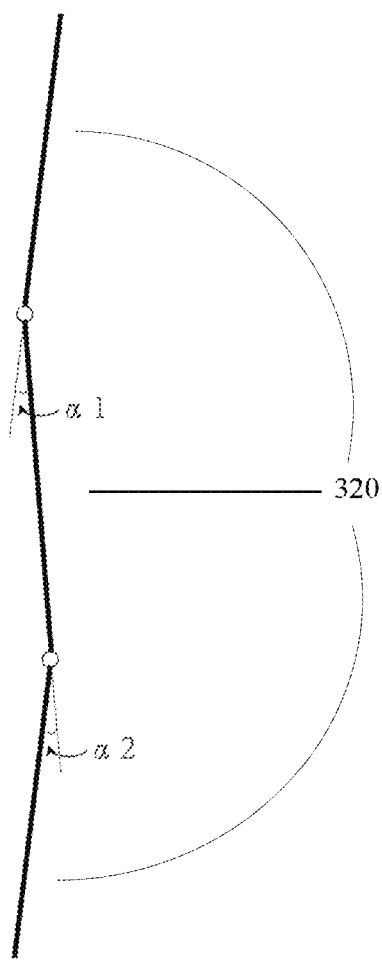
FIG. 5 is a schematic diagram of a connection angle of an intermediate transmission component of a transmission structure according to embodiments of the present disclosure.

In addition, in combination with FIG. 5, in one embodiment of the present disclosure, an angle between the two adjacent second transmission shafts 320 is not greater than 10 degrees.

Specifically, as shown in the drawings, the intermediate transmission component 30 is formed by three second transmission shafts 320 sequentially coupled head and tail, and two angles between the second transmission shafts 320 are $\alpha 1$ and $\alpha 2$. Herein, the angles $\alpha 1$ and $\alpha 2$ are not greater than 10 degrees, which can ensure a good transmission effect among the transmission shafts of the intermediate transmission component 30, and improve the transmission effect of the transmission structure.

Figure 6:
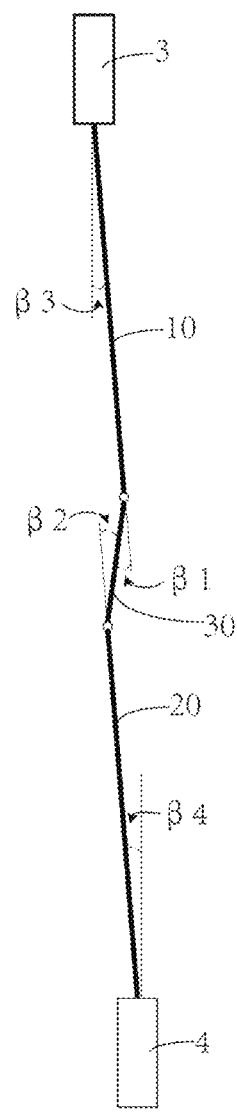
FIG. 6 is a schematic diagram of a connection angle of a transmission structure according to embodiments of the present disclosure.

In addition, in combination with FIG. 6, in one embodiment of the present disclosure, an angle $\beta 1$ between the front transmission shaft 10 and the intermediate transmission component 30 is not greater than 10 degrees, and an angle $\beta 2$ between the rear transmission shaft 20 and the intermediate transmission component 30 is not greater than 10 degrees.

Here, through the arrangement that the angles $\beta 1$ and $\beta 2$ are not greater than 10 degrees, it may ensure a good transmission effect among the transmission shafts in the transmission structure, and improve the transmission effect of the transmission structure.

Moreover, an angle $\beta 3$ between the front transmission shaft 10 and the front axle 3 is not greater than 10 degrees, and an angle $\beta 4$ between the rear transmission shaft 20 and the power assembly 4 is not greater than 10 degrees.

Similarly, through the arrangement that the angles $\beta 3$ and $\beta 4$ are not greater than 10 degrees, it may ensure a good transmission effect between the transmission structure and the front axle 3 and the power assembly 4 at two ends of the transmission structure, and further improve the transmission effect of the transmission structure.

Further, a direction of the angle $\beta 1$ between the front transmission shaft 10 and the intermediate transmission component 30 is opposite to a direction of the angle $\beta 2$ between the rear transmission shaft 20 and the intermediate transmission component 30; a direction of the angle $\beta 3$ between the front transmission shaft 10 and the front axle 3 is opposite to a direction of the angle $\beta 4$ between the rear transmission shaft 20 and the power assembly 4.

Specifically, by arranging the angles $\beta 1$ and $\beta 2$ to be in opposite directions and the angles $\beta 3$ and $\beta 4$ to be in opposite directions, the transmission structure can be prevented from tilting towards a single direction, resulting in the excessive transmission angle of the transmission structure, and hence the transmission structure can return to a central axis as much as possible, and its transmission angle tends to 0 degrees, which may not only improve the transmission effect to the greatest extent, but also greatly save the design space of the vehicle.

Figure 7:
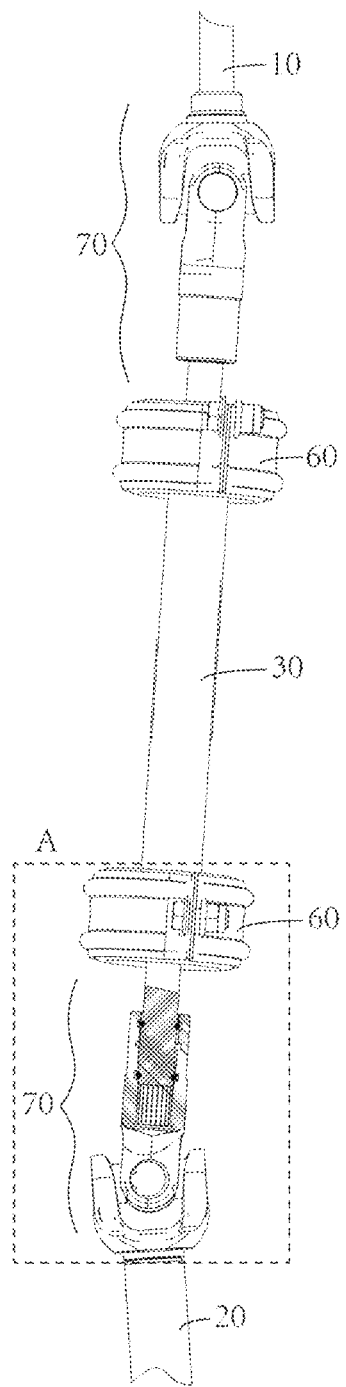
FIG. 7 is a partial section view of a transmission structure according to embodiments of the present disclosure.
Figure 8:
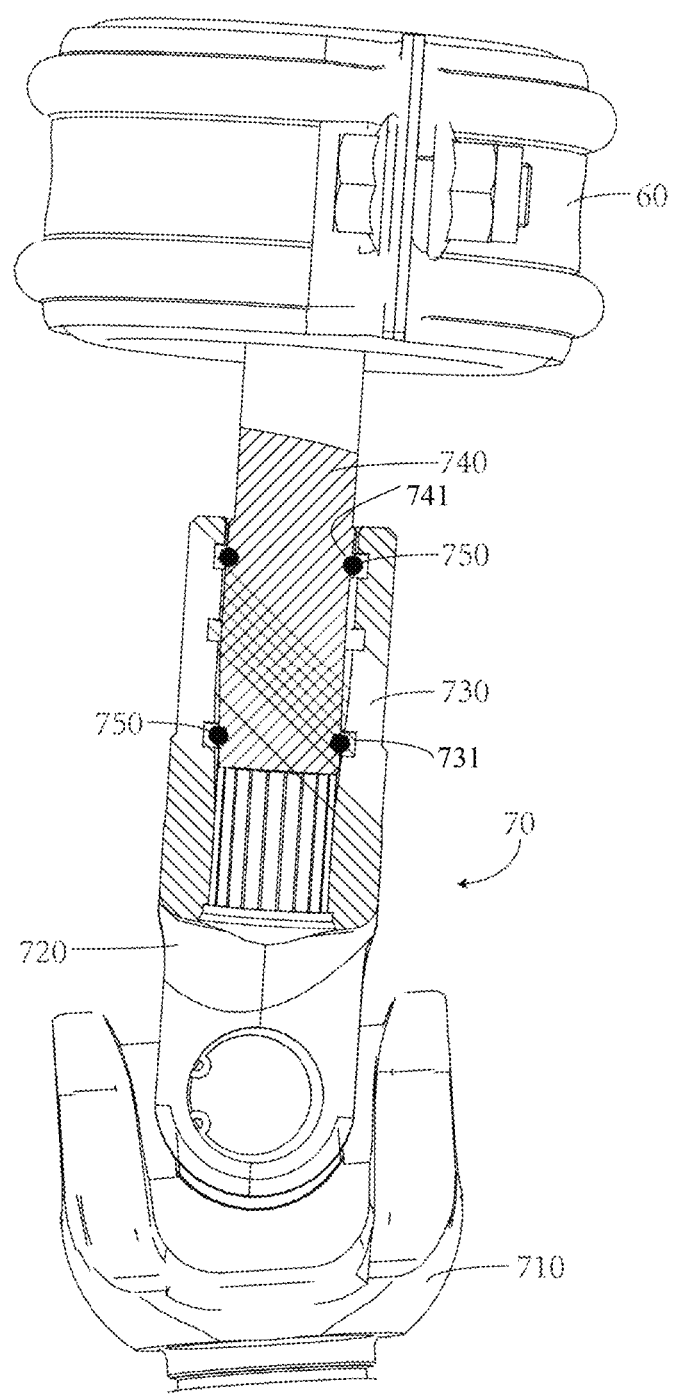
FIG. 8 is an enlarged view of part A in FIG. 7.

Further, referring to FIG. 7 and FIG. 8, in one embodiment of the present disclosure, the intermediate transmission component 30 is coupled to the front transmission shaft 10 and the rear transmission shaft 20 through cross shaft sets 70.

Specifically, each end of the intermediate transmission component 30 is coupled to the cross shaft set 70, and respective ends of the two cross shaft sets 70, away from the intermediate transmission component 30, are coupled to the front transmission shaft 10 and the rear transmission shaft 20, respectively, to achieve power transmission.

Further, the cross shaft set 70 includes a first connection portion 710, a second connection portion 720, a spline sleeve 730, and a spline shaft 740.

The second connection portion 720 and the spline sleeve 730 are coupled to each other. A first end of the first connection portion 710 is coupled to an end, close to the intermediate transmission component 30, of the front transmission shaft 10 or the rear transmission shaft 20, and a second end of the first connection portion 710 is coupled to the second connection portion 720. The two ends of the intermediate transmission component 30 are coupled to the spline shaft 740, the spline shaft 740 is inserted into the spline sleeve 730, and a seal ring 750 is arranged between an outer circumference of the spline shaft 740 and an inner wall of the spline sleeve 730.

Specifically, the first connection portion 710 and the second connection portion 720 have similar structures, and the second end of the first connection portion 710 is coupled to an end of the second connection portion 720 by a cross shaft in a cross form. The difference between the first connection portion 710 and the second connection portion 720 lies in that the first end of the first connection portion 710 is coupled to the end, close to the intermediate transmission component 30, of the front transmission shaft 10 or the rear transmission shaft 20 in a way including but not limited to welding; the second connection portion 720 is coupled to the spline sleeve 730, an opening of the spline sleeve 730 faces the end of the intermediate transmission component 30, and the spline shaft 740 is coupled to the end of the intermediate transmission component 30 and inserted into the spline sleeve 730, to achieve the connection between the intermediate transmission component 30 and the spline sleeve 730. The spline sleeve 730 is provided with lubricating oil therein. By arranging the seal ring 750 between the outer circumference of the spline shaft 740 and the inner wall of the spline sleeve 730, the lubricating oil may be placed in a relatively sealed space to prevent dust and water from entering the spline sleeve 730 and affecting the lubrication effect, to improve the transmission effect of the transmission structure.

The seal ring 750 may be arranged in a groove 731 on the inner wall of the spline sleeve 730 or in a groove 741 on the outer circumference of the spline shaft 740. In an embodiment, a plurality of seal rings 750 are arranged along a length direction of the spline shaft 740 to further improve the sealing effect of the lubricating oil storage space.

It should be noted that the specific embodiments of the present disclosure are described in detail in combination with the accompanying drawings, but cannot be construed as limitation on the protection scope of the present disclosure. In the case of no conflict, structures of various parts mentioned in the above embodiments may be combined. In order to avoid repetition, the technical solutions obtained after the combination will not be elaborated here, but they also fall within the protection scope of the present disclosure. Within the scope described in the claims, various modifications and changes made by those skilled in the art without paying creative efforts still fall within the protection scope of the present disclosure.

Examples of the embodiments of the present disclosure are intended to concisely illustrate technical features of the embodiments of the present disclosure, to allow those skilled in the art to intuitively understand the technical features of the embodiments of the present disclosure, and cannot be regarded as improper limitation on the embodiments of the present disclosure.

The device embodiments described above are merely illustrative, in which units described as separate components may be or may not be physically separated, and components displayed as units may be or may not be physical units, that is, they may be located in one place or distributed to a plurality of network units. A part of or all of the modules may be selected according to actual needs to achieve purposes of the technical solutions of the embodiments. Those skilled in the art may understand and implement the technical solutions without paying creative efforts.

Several embodiments of the present disclosure have been shown and described above. However, as mentioned above, it should be understood that embodiments of the present disclosure are not limited to the forms disclosed herein, and do not mean excluding other embodiments. Instead, various other combinations, modifications and environments can be adopted, and any modification or change can be made under the above teachings or with technologies or knowledge in the related art, within the scope of the concept of the present disclosure described herein. The modifications and changes made by those skilled in the art without departing from the scope of embodiments of the present disclosure should fall within the protection scope of the appended claims.

What is claimed is:

1. An all-terrain vehicle, comprising:
   a frame;
   a cab located at a middle portion of the frame;
   a front axle located at a front side of the cab;
   a power assembly located at a rear side of the cab; and
   a transmission structure coupled to the front axle and the power assembly, and comprising a front transmission shaft, a rear transmission shaft, and an intermediate transmission component;
   wherein:
   the intermediate transmission component has a first end coupled to the front transmission shaft and a second end coupled to the rear transmission shaft;
   an end, away from the intermediate transmission component, of the front transmission shaft is coupled to the front axle, and an end, away from the intermediate transmission component, of the rear transmission shaft is coupled to the power assembly; and
   a connection point between the intermediate transmission component and the front transmission shaft is located at the front side of the cab;
   wherein the front transmission shaft is coupled to the front axle through a spline, and at least one fastening screw is arranged at the connection between the front transmission shaft and the front axle.

2. The all-terrain vehicle according to claim 1, wherein a connection point between the intermediate transmission component and the rear transmission shaft is located at the rear side of the cab.

3. The all-terrain vehicle according to claim 2, further comprising a stabilizer bar arranged at the rear side of the cab, wherein the connection point between the intermediate transmission component and the rear transmission shaft is located behind the stabilizer bar.

4. The all-terrain vehicle according to claim 1, wherein two first support seats are arranged on the frame, and the intermediate transmission component is coupled to the two first support seats through bearings; and
one of the two first support seats is close to the connection point between the intermediate transmission component and the front transmission shaft, and the other of the two first support seats is close to a connection point between the intermediate transmission component and the rear transmission shaft.

5. The all-terrain vehicle according to claim 1, wherein the intermediate transmission component comprises a first transmission shaft with two ends coupled to the front transmission shaft and the rear transmission shaft.

6. The all-terrain vehicle according to claim 1, wherein the intermediate transmission component comprises at least two second transmission shafts, and the at least two second transmission shafts are sequentially coupled head to tail.

7. The all-terrain vehicle according to claim 2, wherein the connection point between the intermediate transmission component and the front transmission shaft is higher than the connection point between the intermediate transmission component and the rear transmission shaft.

8. The all-terrain vehicle according to claim 6, wherein an angle between two adjacent second transmission shafts is not greater than 10 degrees.

9. The all-terrain vehicle according to claim 1, wherein an angle between the front transmission shaft and the intermediate transmission component is not greater than 10 degrees, and an angle between the rear transmission shaft and the intermediate transmission component is not greater than 10 degrees.

10. The all-terrain vehicle according to claim 1, wherein an angle between the front transmission shaft and the front axle is not greater than 10 degrees, and an angle between the rear transmission shaft and the power assembly is not greater than 10 degrees.

11. The all-terrain vehicle according to claim 9, wherein a direction of the angle between the front transmission shaft and the intermediate transmission component is opposite to a direction of the angle between the rear transmission shaft and the intermediate transmission component.

12. The all-terrain vehicle according to claim 10, wherein a direction of the angle between the front transmission shaft and the front axle is opposite to a direction of the angle between the rear transmission shaft and the power assembly.

13. The all-terrain vehicle according to claim 1, wherein the intermediate transmission component has a length greater than a length of the cab along a length direction of the vehicle, and is higher in the front and low in the rear along the length direction.

14. An all-terrain vehicle, comprising:
a frame;
a cab located at a middle portion of the frame;
a front axle located at a front side of the cab;
a power assembly located at a rear side of the cab; and
a transmission structure coupled to the front axle and the power assembly, and comprising a front transmission shaft, a rear transmission shaft, and an intermediate transmission component;
wherein:
the intermediate transmission component has a first end coupled to the front transmission shaft and a second end coupled to the rear transmission shaft;
an end, away from the intermediate transmission component, of the front transmission shaft is coupled to the front axle, and an end, away from the intermediate transmission component, of the rear transmission shaft is coupled to the power assembly; and
a connection point between the intermediate transmission component and the front transmission shaft is located at the front side of the cab;
wherein the intermediate transmission component is coupled to the front transmission shaft and the rear transmission shaft through cross shaft sets.

15. The all-terrain vehicle according to claim 14, wherein:
each of the cross shaft sets comprises a spline shaft, a first connection portion, a second connection portion, and a spline sleeve, the second connection portion and the spline sleeve being coupled to each other;
a first end of the first connection portion is coupled to an end, close to the intermediate transmission component, of the front transmission shaft or the rear transmission shaft, and a second end of the first connection portion is coupled to the second connection portion;
two ends of the intermediate transmission component are coupled to the spline shaft, the spline shaft is inserted into the spline sleeve, and a seal ring is arranged between an outer circumference of the spline shaft and an inner wall of the spline sleeve.

16. The all-terrain vehicle according to claim 15, wherein the seal ring is arranged in a groove on the inner wall of the spline sleeve.

17. The all-terrain vehicle according to claim 15, wherein the seal ring is arranged in a groove on the outer circumference of the spline shaft.

18. The all-terrain vehicle according to claim 15, wherein a plurality of seal rings are arranged along a length direction of the spline shaft.

19. An all-terrain vehicle, comprising:
a frame;
a cab located at a middle portion of the frame;
a front axle located at a front side of the cab;
a power assembly located at a rear side of the cab; and
a transmission structure coupled to the front axle and the power assembly, and comprising a front transmission shaft, a rear transmission shaft, and an intermediate transmission component;
wherein:
the intermediate transmission component has a first end coupled to the front transmission shaft and a second end coupled to the rear transmission shaft;
an end, away from the intermediate transmission component, of the front transmission shaft is coupled to the front axle, and an end, away from the intermediate transmission component, of the rear transmission shaft is coupled to the power assembly; and
a connection point between the intermediate transmission component and the front transmission shaft is located at the front side of the cab;
wherein two first support seats are arranged on the frame, and the intermediate transmission component is coupled to the two first support seats through bearings; and
one of the two first support seats is close to the connection point between the intermediate transmission component and the front transmission shaft, and the other of the two first support seats is close to a connection point between the intermediate transmission component and the rear transmission shaft.

20. The all-terrain vehicle according to claim 19, wherein the bearings are rolling bearings, and two ends of the first transmission shaft are fitted and fixed in respective inner rings of the bearings.

* * * * *